(12) United States Patent
Phadke et al.

(10) Patent No.: US 9,615,116 B2
(45) Date of Patent: Apr. 4, 2017

(54) SYSTEM, METHOD AND APPARATUS FOR SECURELY DISTRIBUTING CONTENT

(75) Inventors: Madhav S. Phadke, Colts Neck, NJ (US); Kedar M. Phadke, Colts Neck, NJ (US)

(73) Assignee: PASAFESHARE LLC, Colts Neck, NJ (US)

( * ) Notice: Subject to any disclaimer, the term of this patent is extended or adjusted under 35 U.S.C. 154(b) by 0 days.

(21) Appl. No.: 13/162,209

(22) Filed: Jun. 16, 2011

(65) Prior Publication Data
US 2012/0321083 A1 Dec. 20, 2012

(51) Int. Cl.
| | | |
|---|---|---|
| *H04K 1/00* | (2006.01) | |
| *H04N 21/254* | (2011.01) | |
| *H04L 29/06* | (2006.01) | |
| *H04N 21/4627* | (2011.01) | |

(52) U.S. Cl.
CPC ..... *H04N 21/2541* (2013.01); *H04L 63/0428* (2013.01); *H04N 21/4627* (2013.01); *H04L 2463/041* (2013.01)

(58) Field of Classification Search
CPC ......... H04L 2209/603; H04L 29/06482; H04L 67/04; H04L 2463/082; G06F 21/10
USPC ........................................ 380/255
See application file for complete search history.

(56) References Cited

U.S. PATENT DOCUMENTS

| | | | | |
|---|---|---|---|---|
| 6,069,957 A * | 5/2000 | Richards | ............... | H04L 9/0836 380/210 |
| 6,185,684 B1 * | 2/2001 | Pravetz et al. | ................. | 713/182 |
| 6,336,189 B1 * | 1/2002 | Takeda | ................ | G06F 21/6209 726/2 |
| 6,772,340 B1 * | 8/2004 | Peinado | .................. | G06F 21/10 380/201 |
| 6,920,567 B1 * | 7/2005 | Doherty | ................. | G06F 21/10 707/999.104 |
| 7,130,831 B2 * | 10/2006 | Howard | ................. | G06F 21/10 705/57 |
| 7,359,517 B1 * | 4/2008 | Rowe | ................. | G06F 21/6218 380/284 |
| 8,132,020 B2 * | 3/2012 | Zhu | ..................... | H04L 63/0853 380/279 |
| 2002/0007453 A1 * | 1/2002 | Nemovicher | ....... | H04L 12/5875 713/155 |
| 2002/0048369 A1 * | 4/2002 | Ginter et al. | ................. | 380/277 |
| 2002/0138843 A1 * | 9/2002 | Samaan | ............ | H04N 7/17318 725/87 |
| 2002/0184517 A1 * | 12/2002 | Tadayon et al. | ............. | 713/200 |
| 2003/0009423 A1 * | 1/2003 | Wang et al. | .................... | 705/51 |
| 2003/0023564 A1 * | 1/2003 | Padhye et al. | .................. | 705/54 |
| 2003/0135466 A1 * | 7/2003 | Wang et al. | .................... | 705/51 |
| 2004/0054930 A1 * | 3/2004 | Walker | ................... | H04L 63/10 726/30 |
| 2004/0193546 A1 * | 9/2004 | Tokutani | ................ | G06F 21/10 705/59 |

(Continued)

*Primary Examiner* — Glenton B Burgess
*Assistant Examiner* — Tariq Najee-Ullah
(74) *Attorney, Agent, or Firm* — Meagher Emanuel Laks Goldberg & Liao, LLP

(57) ABSTRACT

System, method and apparatus for securely distributing content via an encrypted file wherein a Publisher Key (PK) associated with an authorized publisher enables presentation of the content by the authorized user via a Limited Capability Viewer (LCV), the LCV lacking the capability to forward, print, copy or otherwise disseminate the content to be presented.

32 Claims, 8 Drawing Sheets

(56) References Cited

U.S. PATENT DOCUMENTS

| | | | |
|---|---|---|---|
| 2005/0185792 A1* | 8/2005 | Tokutani | H04L 63/0442 380/30 |
| 2006/0080259 A1* | 4/2006 | Wajs | G06F 21/10 705/51 |
| 2006/0080453 A1* | 4/2006 | Thukral | H04N 21/47202 709/231 |
| 2007/0174203 A1* | 7/2007 | Oho | G06F 21/10 705/59 |
| 2007/0240203 A1* | 10/2007 | Beck | G06F 19/322 726/4 |
| 2007/0269044 A1* | 11/2007 | Bruestle | G06F 21/10 380/54 |
| 2008/0040283 A1* | 2/2008 | Morris | G06F 21/10 705/59 |
| 2008/0240447 A1* | 10/2008 | Zhu | H04L 63/0853 380/279 |
| 2009/0124375 A1* | 5/2009 | Patel | 463/29 |
| 2011/0119361 A1* | 5/2011 | Issa | G06F 17/30011 709/223 |
| 2012/0102317 A1* | 4/2012 | Mathur et al. | 713/156 |
| 2012/0102329 A1* | 4/2012 | Mittal et al. | 713/176 |

* cited by examiner

SYSTEM, METHOD AND APPARATUS FOR SECURELY DISTRIBUTING CONTENT

FIELD OF THE INVENTION

The invention relates generally to the distribution of content and, more specifically but not exclusively, protecting such content from redistribution or re-presentation.

BACKGROUND

The various techniques exist for secure content distribution. Such techniques include password protection of content (e.g., password protection of a document or media file), access restrictions associated with content (e.g., username and password requirements associated with a web portal) and so on. Some of the techniques require proprietary software or middleware executed at a client device. Other techniques require real-time user authentication via an authentication server or other device connected to a client via a network such as the Internet.

SUMMARY

Various deficiencies in the prior art are addressed by systems, methods and apparatus providing secure content publication and presentation capabilities. One embodiment of a method for securely distributing content, comprises generating an encrypted file including content or a link thereto, and a Publisher Key (PK) associated with presentation of said content by an authorized user via a Limited Capability Viewer (LCV); and propagating the generated encrypted file towards a user. The LCV may comprise 1) a program specifically designated to consume content while restrict editing, printing, copying, etc. of content; or 2) a native program for consuming content which is used in a restrictive mode to restrict editing, printing, copying, etc of content. Only users who have a Content Consumer License (CCL) compatible with the encrypted PK may access and consume the content. The CCL may be distributed via hardware or software.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
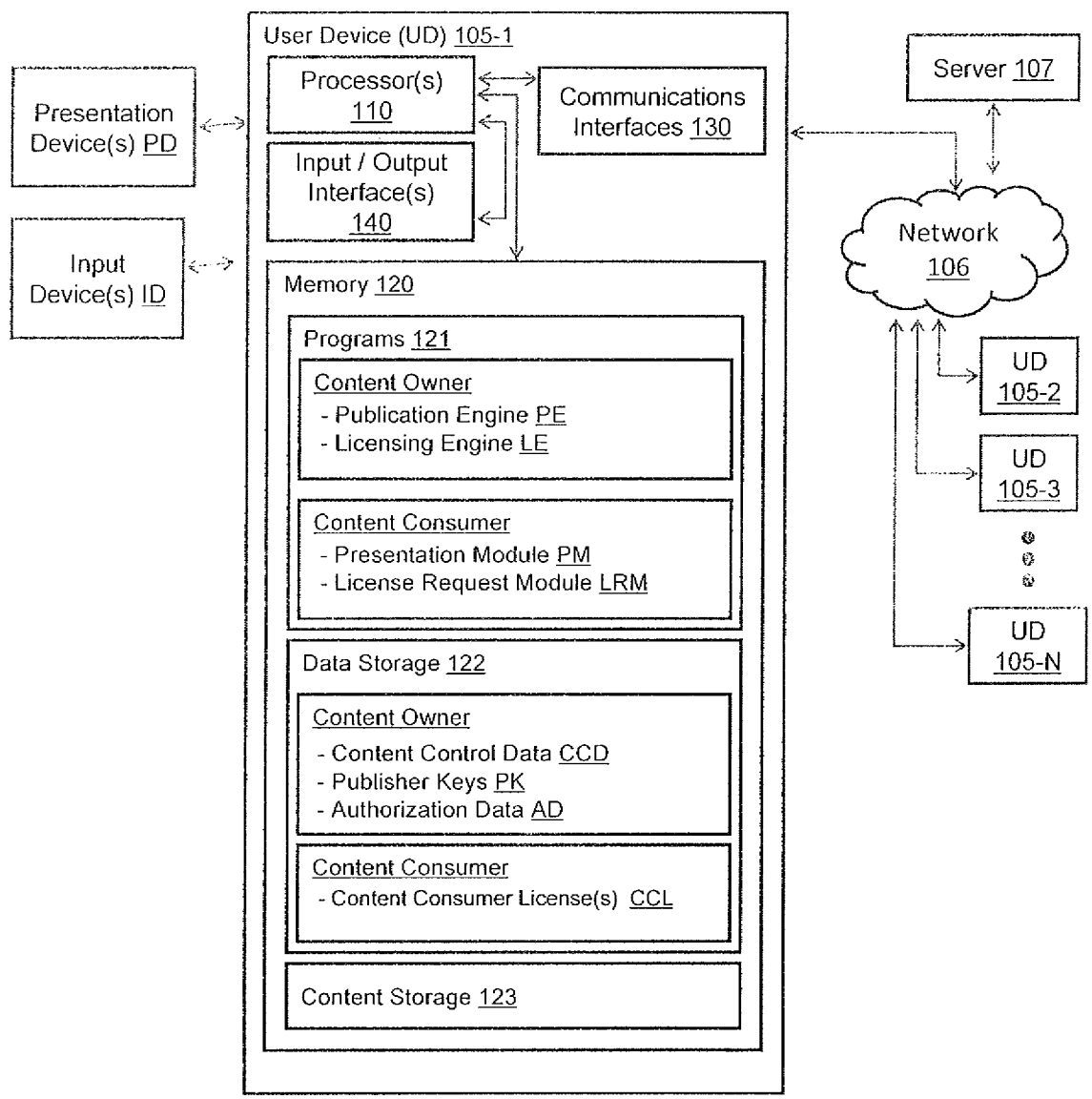
FIG. 1 depicts a high-level block diagram of a system according to one embodiment.

A secure content distribution capability is depicted and described herein. The secure content distribution capability enables efficient and secure distribution of content to specific users for a limited purpose, such as presentation of a securely distributed document upon a presentation device. The securely distributed documents may not be printed by specific users or forwarded to other users for presentation, printing or other purposes.

Although the secure content distribution capability is primarily depicted and described herein within the context of a specific document format, it will be appreciated that the secure content distribution capability may be used for distributing documents according to various other formats. Broadly speaking, the secure content distribution capability may be used to securely distribute any type of content including documents or files according to various formats, as well as streaming media such as audio and/or video and other active content.

The various embodiments include methodologies implemented in software and/or hardware for securely distributing content such as documents between content owners or other content source entities and content consumers. These security methodologies provide user specific authentication, machine specific authentication and the like to ensure that only a specific user, or a specific user machine, or a specific user on a specific user machine is authenticated to access the secure content. Moreover, the security methodologies prevent users from printing, copying, modifying or saving the protected documents, and are capable of providing security within and across corporate networks and other domains. For example, where protected documents or files are sent to other users via email or other transfer means, the documents or files are unreadable by recipient without permission of content owner.

The various embodiments contemplate that securely distributed content, documents or other files is presented using Limited Capability Viewer LCV for viewing in a native content, document or other file format. For example, a Microsoft PowerPoint file protected according to various embodiments may be viewed using the end user's Microsoft PowerPoint or Microsoft PowerPoint Viewer program. Thus, all animations, multimedia, and other dynamic content are preserved and the end user will get a true presentation experience. However, all content is fully encrypted and protected while opened by the user and also during transmission from the content owner to the user. Similarly, Microsoft Word, Excel, Visio, and other files which are protected by the software will be viewed using corresponding native programs while protected.

A protected document package can have one or multiple files. These files can be grouped into tiers of security level so that end users can access only the files they are specifically authorized to access. A protected document package may comprise a database including varying one or more content files, wherein the one or more content files are extracted from the database prior to secure presentation via the Limited Capability Viewer LCV program.

It is noted that the content owner does not need to know all the end users before creating the protected document packages. In this manner, the various embodiments eliminate a need for a common, central user management service while allowing for easy within domain, cross-domain, and cross-company sharing of protected documents.

It is noted that there is no requirement for online verification of a user prior to secure presentation of a protected document package. Keys and other data structures adapted for enabling secure presentation of the protected document package may be distributed prior to secure content presentation or after an attempt to securely present the content. Moreover, multiple keys of different types are employed within the context of the various embodiments to enable a flexible mechanism for securely presenting content.

FIG. 1 depicts a high-level block diagram of a system according to one embodiment. Specifically, the system 100 of FIG. 1 contemplates a plurality of user devices 105 communicating with each other via the network 106. In various embodiments, the user devices 105 optionally communicate with a server 107 via the network 106.

The plurality of user devices 105 are denoted as user devices 105-1, 105-2, 105-3 and so on up to 105-N. In the embodiments discussed herein, each of the user devices 105 is configured in substantially the same manner in terms of hardware, software, resources and the like. However, it will be appreciated by those skilled in the art that the various user devices 105 may comprise different classes of user devices such as computers, mobile devices, smart phones, set-top terminals, heavy clients, light clients and so on. Generally speaking, a user device 105 is simply a device capable of operating in accordance with one or more aspects of the present invention, and many different user device configurations may be used at the same time.

As depicted in FIG. 1, each user device 105 includes a processor 110, a memory 120, communications interfaces 130 and an input-output (I/O) interface 140. The processor 110 is coupled to each of memory 120, communication interfaces 130, and I/O interface 140.

The processor 110 is configured for controlling the operation of user device 105, including operations supporting the secure content publication and presentation capabilities described herein with respect to the various embodiments.

The memory 120 is configured for storing information suitable for use in providing the advertising presentation and transaction capability. Memory 120 may store programs 121, data 122, content 123 and the like. Within the context of the various embodiments, the programs 121 and data 122 may vary depending upon whether the user device 105 is operating as a content owner, or a content consumer or both.

When a user device 105 operates in a content owner or content source mode of operation, the programs 121 may comprise a publication engine PE, a licensing engine LE and/or other programs adapted for implementing the secure content sourcing/publication methodologies described herein. Similarly, in the content owner or content source mode of operation, the data storage 122 may comprise content control data CCD, publisher keys PK, authorization data AD and/or other data adapted for implementing the secure content sourcing/publication methodologies described herein. The content storage 123 may include content, uniform resource locators (URLs) or other data structures pointing to content, to be securely published and transmitted toward one or more user devices 105 operating in a content consumer mode.

When a user device 105 operates in a content consumer or content destination mode of operation, the programs 121 may comprise a presentation module PM, a license request module LRM and/or other programs adapted for implementing the secure content consumption/presentation methodologies described herein. Similarly, in a content consumer mode of operation, the data storage 122 may comprise one or more Content Consumer Licenses CCL and/or other data adapted for implementing the secure content consumption/presentation methodologies described herein.

Generally speaking, the memory 120 may store any information suitable for use by the user device 105 in implementing one or more of the secure content sourcing/publication methodologies described herein, the secure content consumption/presentation methodologies described herein or other functions.

The communications interfaces 130 may include a location signaling interface such as a global positioning GPS and or cellular telephone tower triangulation system to determine the location of the user device 105.

The communications interfaces 130 include one or more services signaling interface such as a Wi-Fi or WiMAX interface, a 3 G wireless interface, a 4 G wireless interface, an Ethernet interface and the like for supporting data/services signaling between user device 105 and the network 106. It will be appreciated that fewer or more, as well as different, communications interfaces may be supported. The various communications interfaces 130 are adapted to facilitate the transfer of files, data structures, messages, request and the like between various entities in accordance with the embodiments discussed herein.

It will be appreciated that the various embodiments do not require a continual online presence. Once content consumer has received CCL from content owner (whether via hardware or software), the content consumer can be completely disconnected from all networks and communication interfaces depending on the embodiment and configuration of user device 105. For example, a recipient presenting content in a protected manner does not need to be communicating with another entity at the time such content is processed and/or presented by a user device. The I/O interface 140 may be coupled to presentation devices PD interface(s) such as associated with display devices for presenting information to a user, input devices ID such as touch screen or keypad input devices for enabling user input, and/or interfaces enabling communication between the user device 105 and other computing or input/output devices (not shown).

Presentation devices PD may include a display screen, a projector, one or more speakers, and the like, which may be used for displaying data, displaying video, playing audio, and the like, as well as various combinations thereof. The typical presentation interfaces of user devices, including the design and operation of such interfaces, will be understood by one skilled in the art.

Input devices ID may include any user control devices suitable for use in enabling the user of the user device 105 to interact with the user device 105. For example, the input devices IDs may include touch screen based user controls, stylus-based user controls, a keyboard and/or mouse, voice-based user controls, and the like, as well as various combinations thereof. The typical user control interfaces of user devices, including the design and operation of such interfaces, will be understood by one skilled in the art.

Although primarily depicted and described as having specific types and arrangements of components, it will be appreciated that any other suitable types and/or arrangements of components may be used for user device 105.

It will be appreciated that the functions depicted and described herein may be implemented in software and/or hardware, e.g., using a general purpose computer, one or more application specific integrated circuits (ASIC), and/or any other hardware equivalents. In one embodiment, the various programs depicted as loaded within memory 120 are executed by the processor 110 to implement their respective functions. It will also be appreciated that the various programs may be stored on a computer readable storage medium prior to being loaded into memory 120; such computer readable storage media comprising semiconductor memory devices, magnetic media, optical media, electromagnetic media and the like. Generally speaking, any form of tangible computer memory may be used to store computer instructions which, when executed by the processor 110, operate to perform the various methods and functions described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a broadcast or other tangible signal-bearing medium, and/or stored within a memory within a computing device operating according to the instructions.

In various embodiments, the server 107 may operate as a content owner or content source as described above with respect to the user device 105. That is, the server 107 may include the various functionality described above with respect to user device 105 such that the server 107 may implement the secure content sourcing/publication methodologies as described herein.

In various embodiments, the server 107 cooperates with one or more user devices 105 to implement the secure content sourcing/publication methodologies described herein. For example, the server 107 may be used to perform the function of a publication engine PE, licensing engine LE and/or other content owner functions on behalf of a source user device 105. The securely published content may then be transmitted to recipient user devices via the source user device 105 or via the server 107.

In various embodiments, the server 107 cooperates with one or more user devices 105 to implement the secure content consumption/presentation methodologies described herein. For example, the server 107 may be used to assist in the performance of the functions of a presentation module PM, a license request module LRM and/or other content consumer functions on behalf of a destination user device 105.

It is noted that the presentation module PM associated with a destination user device operates in a manner preventing further conveyance of securely published content to other entities, storage of the securely published content to the destination user device, printing of the securely published content and so on.

As an example, the PDP may define a specific Microsoft PowerPoint file that is authorized for presentation by a particular user (e.g., user machine initially executing the received file including the PDP), using a particular type of presentation program (e.g., the limited function Microsoft PowerPoint viewer), and only within a particular time period (e.g., within the next 48 hours). It is noted that upon receiving the PDP, the specific computer executing the PDP container file is examined to determine, illustratively, a processor identification number or other identifier associated with the computer to establish thereby the one computing device authorized to present the securely published content.

The CCL may be delivered via email, web, optical media, magnetic media, semiconductor media or any other electronic transmission, software or hardware delivery method. For example, the CCL may be delivered via a hardware means such as a USB memory device, an SD memory device or other semiconductor memory device; a CD ROM, DVD or other optical memory device; or a hard disk drive, mass storage device or other media including thereon software instructions representing the CCL.

A hardware device provided the CCL may be constrained to a particular type of device (i.e., an approved device), such as a specific type or capacity of memory device. In various embodiments, the hardware device is merely used to deliver the CCL. In other embodiments, the hardware device including the CCL is necessary for presentation by the LCV. That is, the CCL operates as a hardware key to provide secure access or presentation of content.

For example, in one embodiment an entity such as an employer (content source) provides its employees (content consumers) with a specific type of hardware key that must be used to present the content. The employee must have the hardware key inserted in the computer to present the content.

Thus, in various embodiments, a Content Consumer License (CCL) is generated for each authorized user and distributed for each authorized user via a computer readable medium. The CCL provided in this manner is effective to enable secure content viewing by the authorized user only when the computer readable medium including the CCL is operatively connected to a computing device associated with the authorized user.

Figure 2:
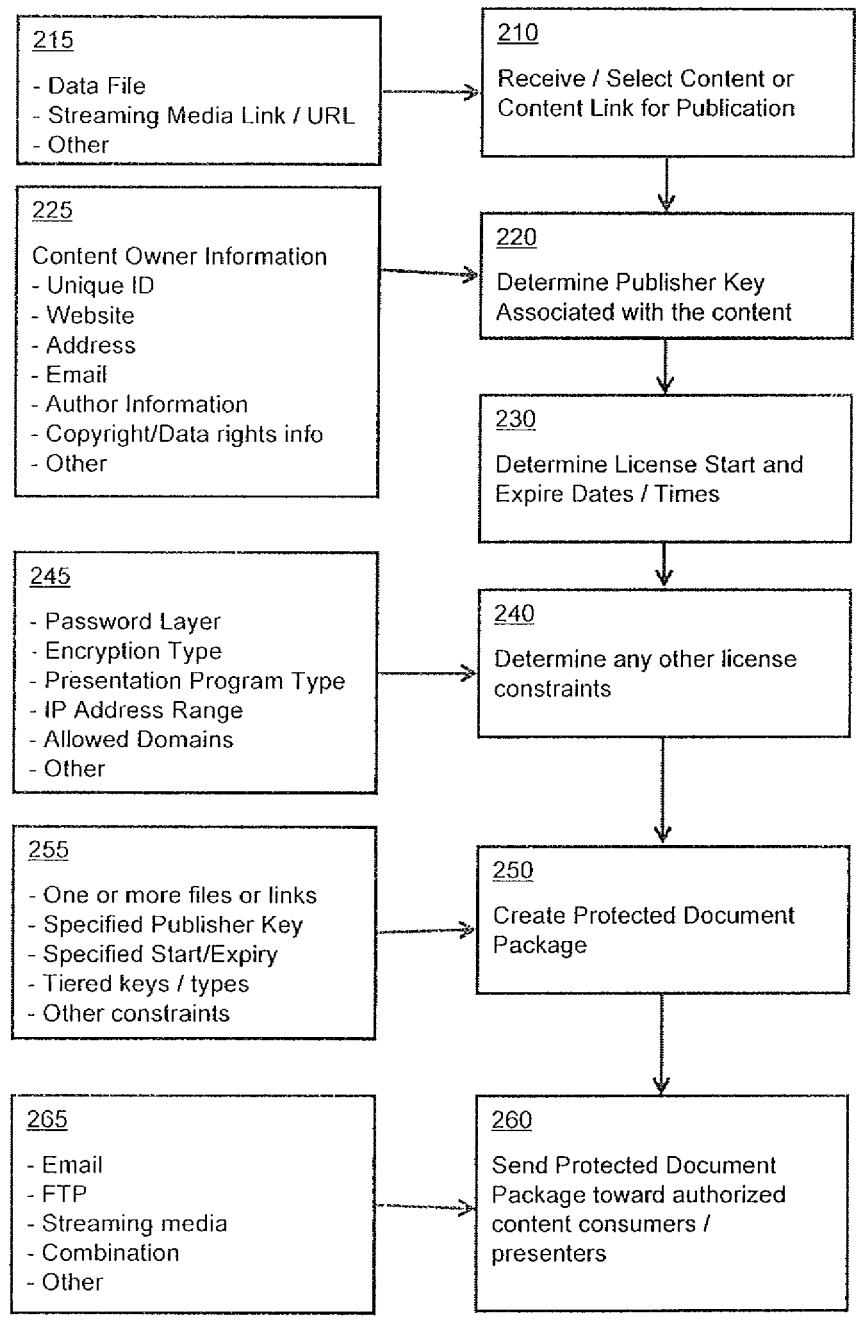
FIG. 2 depicts a flow diagram of a secure content publication method according to one embodiment.

FIG. 2 depicts a flow diagram of a secure content publication method according to one embodiment. Specifically, the method 200 of FIG. 2 is adapted to publishing content in a secure manner and distribute that content toward content consumers for secure presentation. The method 200 may be invoked within the context of a publication engine PE of a user device 105 or server 107 implementing the secure content sourcing/publication methodologies of the various embodiments.

At step 210, content to be published or a URL identifying content to be sourced or published is received or selected by, illustratively, a user device 105 or server 107 operating in a content owner or content source mode of operation. Referring to box 215, the content to be published may comprise a data file, the media file, a streaming media link/URL or other data file type or link thereto. At step 220, the Publisher Key PK or Publisher Keys associated with the content are determined by content owner. Referring to box 225, this determination may be made with respect to Content Owner Information such as Unique ID, Website, Physical Address, Email Address, Author Information, Copyright/Data or other rights information, and/or other types of information.

At step 230, licensing start and/or licensing expiration date and time information is optionally determined. That is, a date-bounded window within which the securely published content may be presented is defined. If further position is desired, a time-bounded window is also determined. The securely published content may be presented during the allowed window. Attempt to present the securely published content outside of the defined presentation window will not be allowed. Optionally, attempts to present the content outside of the defined window will result in the content being deleted or destroyed.

At step 240, a determination is made as to any other constraints associated with the license to present the securely published content. Referring to box 245, other licensing constraints may be defined in terms of a password protection layer, a type of encryption used to secure the content, a type of presentation program used to present the content, an IP address range associated with devices allowed to present the content, one or more domain names associated with devices allowed to present the content and other constraints. Optionally, attempts to present the content outside of the defined other licensing constraints will result in the content being deleted or destroyed.

At step 250, a Protected Document Package (PDP) associated with the protected content is created. Referring to box 255, the PDP comprises a file or other data structure including one or more files (or links thereto) associated with the content to be protected and the specified publisher keys associated with authorized content users/presenters. Optionally, the PDP may also include one or more of the following: the specified start and expiry dates and/or times associated with a defined presentation window, tiered publication keys and/or other types of tiered constraints, and other defined licensing constraints.

At step 260 the PDP is transmitted towards authorized content consumers or presenters. Referring to box 265, the PDP may be transmitted via e-mail, file transfer protocol (FTP), streaming media, other types of data transfer means and/or a combination of any of the above. In particular, a file or other data structure representing the PDP may be transmitted towards authorized content users. Alternatively, a link to a file or other data structure representing the PDP may be transmitted towards authorized content users.

In various embodiments, the methodology 200 of FIG. 2 is adapted to provide a Protected Document Package PDP for conveyance to an authorized user. The protected document package may be included within a container file or other data structure suitable for processing at a receiving computer. The PDP or its container file may be self-executing. Alternatively, the PDP or its container file may be processed in conjunction with a client file resident at (or retrievable by) the receiving computer.

Figure 3:
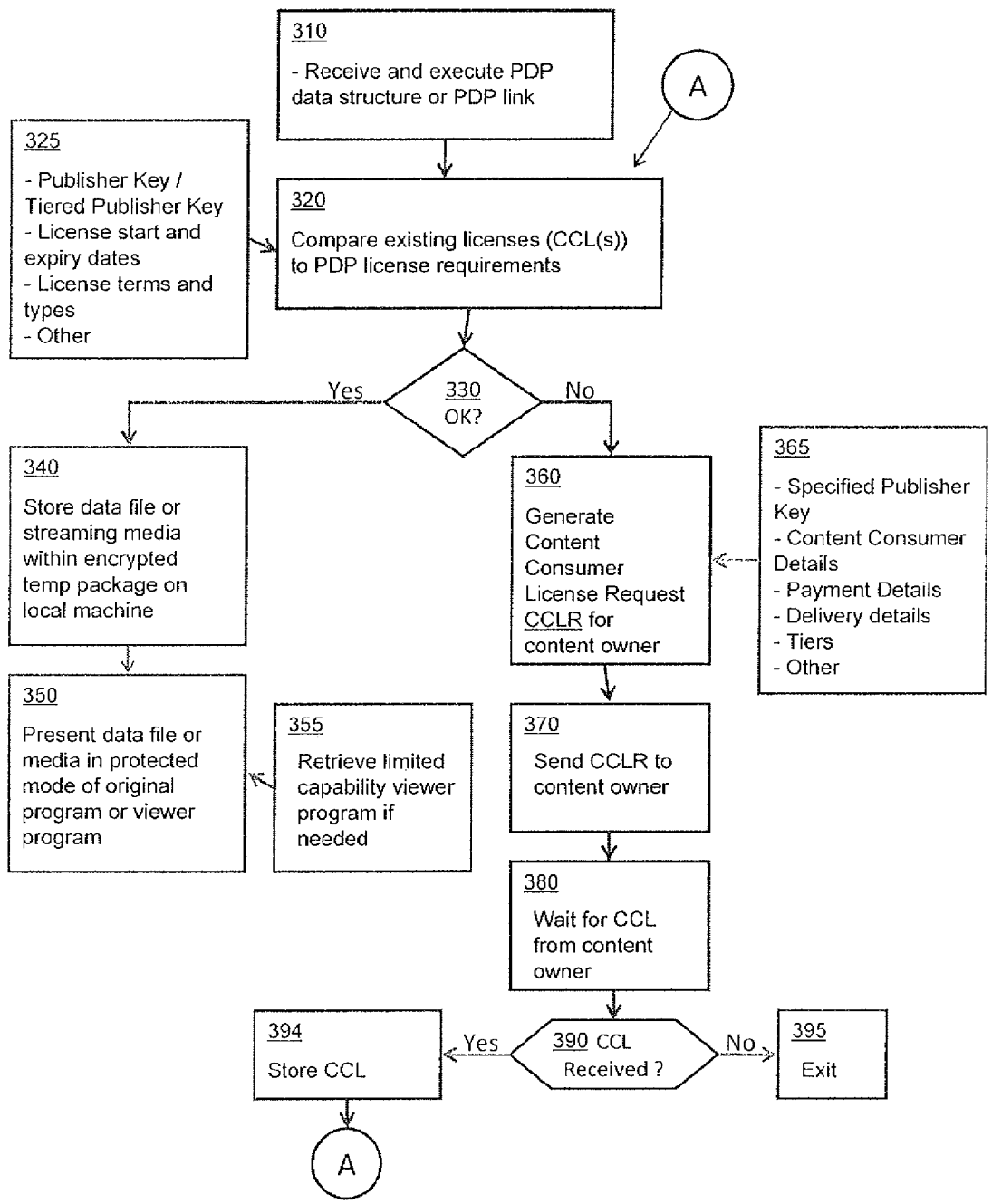
FIG. 3 depicts a flow diagram of a secure content presentation method according to one embodiment.

FIG. 3 depicts a flow diagram of a secure content presentation method according to one embodiment. Specifically, the method 300 of FIG. 3 is adapted to process a received PDP or PDP container to securely present the associated content. The method 300 may be invoked within the context of a presentation module PM and/or license request module LRM of a user device 105 implementing the secure content consumption/presentation methodologies of the various embodiments.

The method 300 may be invoked by a self executing program associated with a received PDP or PDP container. The method 300 may also be invoked by a previously instantiated client program at a user device.

At step 310, a user receives and executes a PDP data structure or PDP link. That is, at step 310 a file or other data structure representing a Protected Document Package (PDP), or a link, URL or other pointer to a file or other data structure representing a PDP is received and executed.

As previously noted with respect to step 265, the user may receive PDP information via e-mail, file transfer protocol, streaming media and so on. In one embodiment, the PDP file, data structure, or link thereto is included within an executable PDP or an executable container program including the PDP information. In this embodiment, the PDP file, data structure or link thereto is executed/instantiated by the user. In another embodiment, a client program resident at the receiving computer is used to execute/instantiate the received PDP file, data structure or link.

At step 320, one or more existing licenses associated with the user (e.g., stored as Content Consumer License files) are compared to the received PDP licensing and/or operating requirements to determine whether the received PDP license and/or operating requirements are satisfied. Referring to box 325, this comparison contemplates one or more of comparing Publisher Keys PK or tiered Publisher Keys, license start and expiry dates/times, various licensing terms, licensing types and other licensing constraints, or other license and/or operating requirements.

At step 330, a determination is made as to whether the received PDP license and/or operating requirements were satisfied at step 320. If the received PDP license and/or operating requirements were satisfied at step 320, then the method 300 proceeds to step 340. Otherwise, the method 300 proceeds to step 360.

At step 340, the securely published data file is stored within an encrypted temporary package on the local machine (i.e., the receiving user device/computer). In the case of a securely published streaming media file, some or all of the securely published streaming media file may be stored within an encrypted temporary package and the local machine. In the case of a link to a securely published data file or streaming media file, some or all of the content associated with that link may be stored within an encrypted temporary package and the local machine. As an example, if the securely published data file comprises a Microsoft PowerPoint file, the Microsoft PowerPoint file is stored within an encrypted temporary package and the local machine.

At step 350, the securely published data file or streaming media is presented using a Limited Capability Viewer LCV, such as a protected mode of a native program associated with the securely published data file streaming media or a standalone viewer program. Referring to box 355, a limited capability viewer program is retrieved if needed. The native program operating in a protected mode of operation, as well as the Limited Capability Viewer LCV program, do not have the capability to print, e-mail or otherwise transfer the content of the securely published data file or streaming media. In this manner, the authorized user may only present the securely published data file or streaming media within the date, time or other license constraints.

It is noted that the protected mode of the native program or limited capability viewer is used to present an encrypted file or portion thereof. The encryption and local storage of the securely published data file, as well as the decryption/presentation by the native program or Limited Capability Viewer LCV is invoked without user interaction.

The Limited Capability Viewer LCV may comprise a standalone program or a subset of the functionality associated with a program natively adapted to present the securely published data file or streaming media. In one embodiment, the Limited Capability Viewer LCV or a link thereto is included within the PDP. In one embodiment, the limited capability viewer is associated with a client program resident at the content consumer user device.

If the received PDP license and/or operating requirements were not satisfied at step 320, then at step 360 a Content Consumer License Request (CCLR) is generated for the content owner or content source. Referring to box 365, the CCLR includes one or more of a request for a specified publisher key necessary to view the contents within the PDP data structure, content consumer details such as identification of proposed authorized user(s), group of users, domain of users and the like, payment details as appropriate, content delivery details such as destination e-mail address, domain or IP address(es) associated with proposed authorized user (s), desired key or tier, number of keys requested and/or other information pertinent to enabling the content owner or source to determine whether or not access to secure content should be granted, as well as the conditions associated with that access.

At step 370, the CCLR is transmitted towards the content owner or source, and at step 380, the method waits to receive a Content Consumer License CCL from the content owner or source. As previously noted, the CCL may be delivered via email, web, optical media, magnetic media, semiconductor media or any other electronic transmission, software or hardware delivery method.

At step 390, a determination is made as to whether a CCL has been received, such as received within a predefined period of time. If a CCL is not received within a predefined period of time, or a CCL request denial has been received, then the method 300 exits at step 395. If a CCL is received, then the CCL is stored at step 394 and the method 300 proceeds to step 320.

Figure 4:
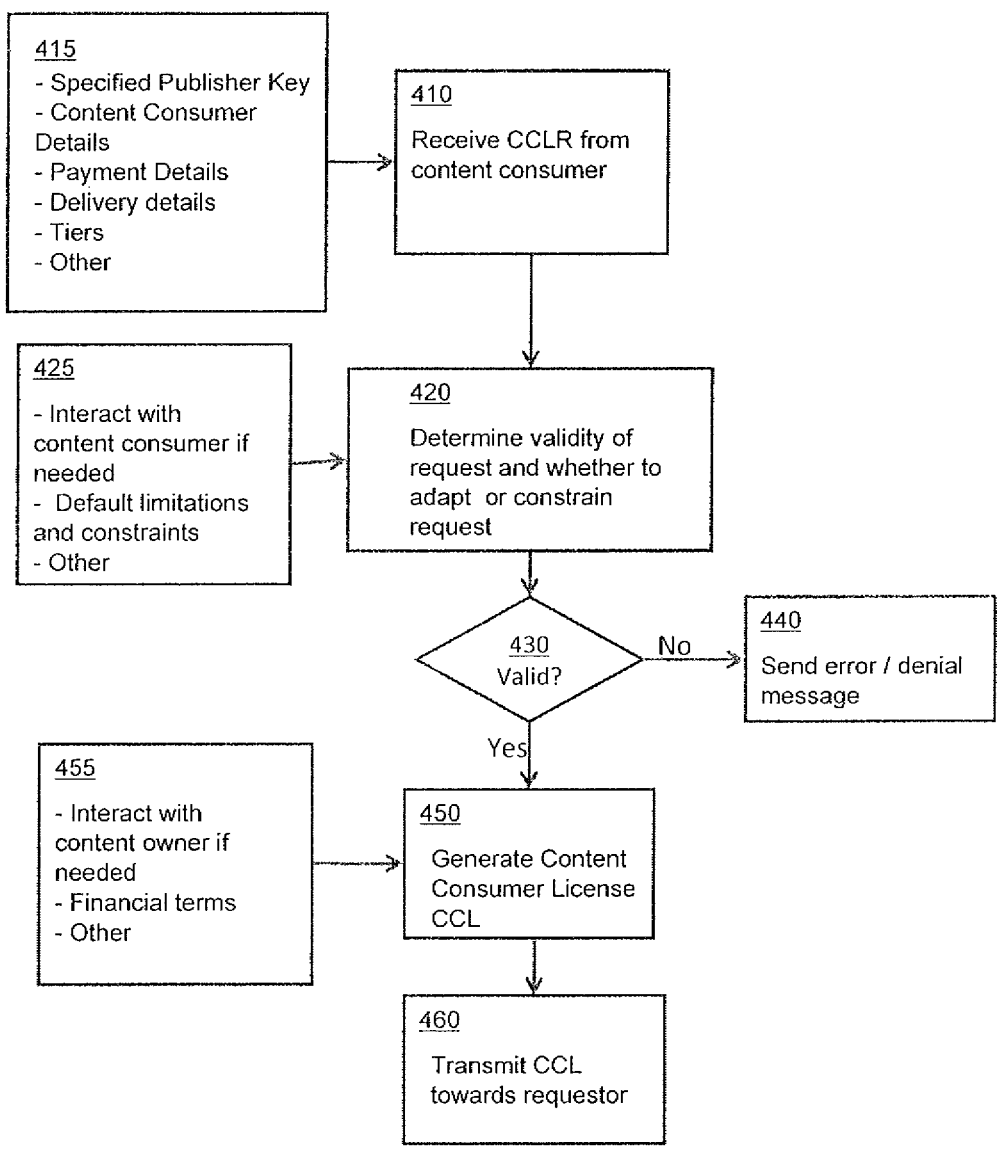
FIG. 4 depicts a flow diagram of a method for processing a content consumer license request suitable for use in various embodiments.

FIG. 4 depicts a flow diagram of a method for processing a Content Consumer License Request CCLR suitable for use in various embodiments. Specifically, the method 400 of FIG. 4 is adapted to generating one or more Content Consumer Licenses (CCL) as appropriate in response to a Content Consumer License Request (CCLR) from a user, such as discussed above with respect to FIG. 3. The method 400 may be invoked within the context of a licensing engine LE of a user device 105 or server 107 implementing the secure content sourcing/publication methodologies of the various embodiments.

At step 410, a Content Consumer License Request (CCLR) is received from a user or other presentation entity. Referring to box 415, the CCLR includes some or all of the information described above with respect to box 365; namely, one or more of a request for a specified publisher key necessary to view the contents within the PDP data structure, content consumer details such as identification of proposed authorized user(s), group of users, domain of users and the like, payment details as appropriate, content delivery details such as destination e-mail address, domain or IP address(es) associated with proposed authorized user(s), desired key or tier, number of keys requested and/or other information pertinent to enabling the content owner or source to determine whether or not access to secure content should be granted, as well as the conditions associated with that access. At step 420, a determination is made as to whether the received CCLR is valid and whether it is appropriate to adapt or constrain the request. Referring to box 425, interaction with the content consumer may be needed to determine the validity of the request and any appropriate adaptations/constraints to be applied to the request. Alternatively, default limitations and/or constraints may be applied. Other actions may also be taken in response to the request.

At step 430, if the determination at step 420 indicates that the request is not valid, then the method 400 proceeds to step 440 where an error/denial message is transmitted toward the requesting user/presentation entity.

At step 430, if the determination at step 420 indicates that the request is valid, then the method 400 proceeds to step 450 where one or more Content Consumer License (CCL) files are generated either as requested or according to any adaptations or constraints. Referring to box 455, interaction with the content owner or other entities is provided as needed to retrieve data for inclusion within the generated CCL file or files. Additionally, interaction with the content owner or other entities such as bank or credit card processing entities is provided as needed to confirm satisfaction of financial terms associated with the CCL.

At step 460, the generated CCL file or files are transmitted toward the requesting user/presentation entity.

Figure 5:
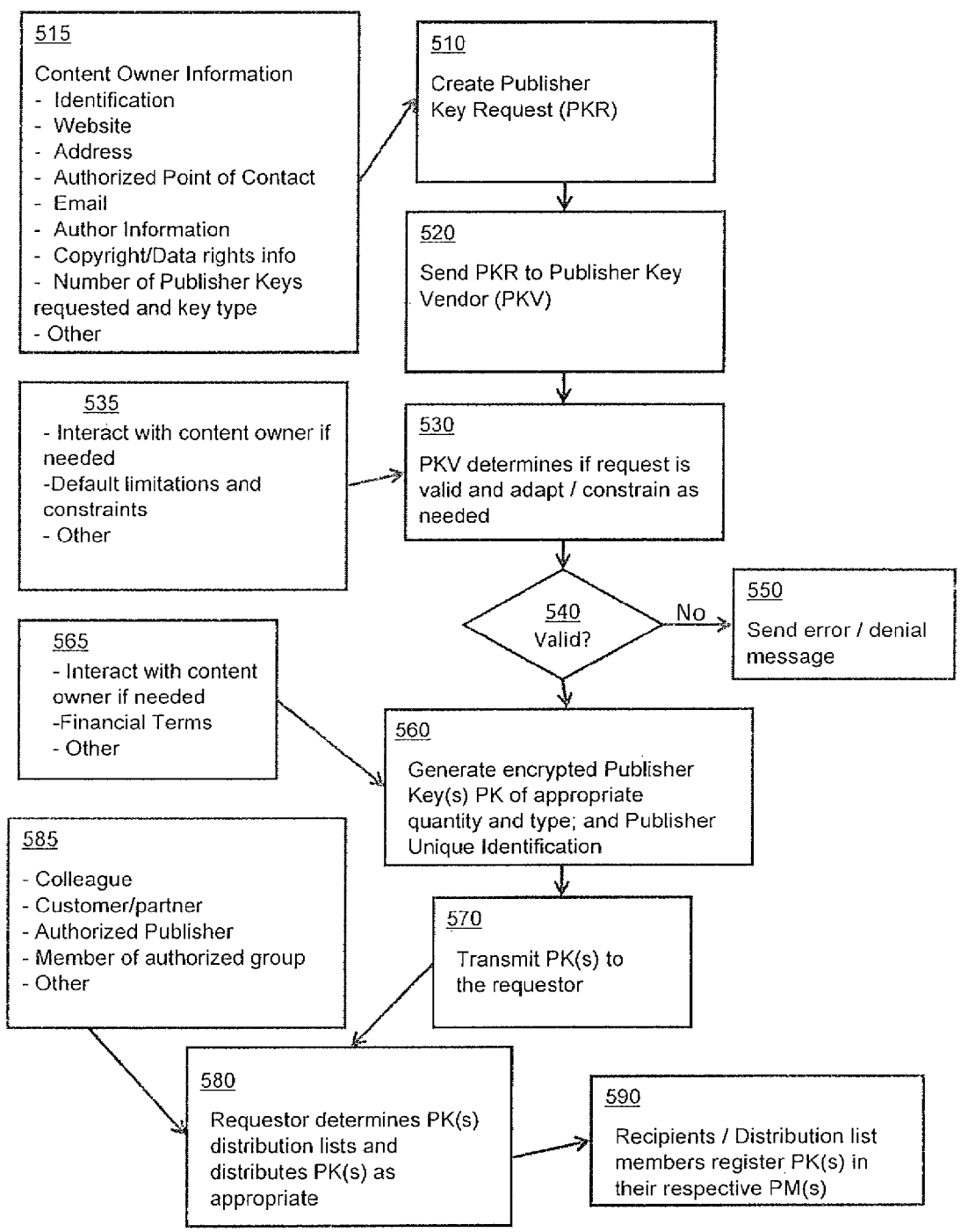
FIG. 5 depicts a flow diagram of a method for processing a publisher key request suitable for use in various embodiments.

FIG. 5 depicts a flow diagram of a method for processing a publisher key request suitable for use in various embodiments. Specifically, the method 500 of FIG. 5 is adapted to generating one or more Publisher Keys (PK) as appropriate in response to a Publisher Key Request (PKR) from a content publisher or content distributor. The method 500 may be invoked within the context of a licensing engine LE of a user device 105 or server 107 implementing the secure content sourcing/publication methodologies of the various embodiments.

At step 510, a Publisher Key Request (PKR) is created. Referring to box 515, the PKR is created using content owner or content source information such as Identification, Website, Address, Authorized Point of Contact, Email, Author Information, Copyright or digital rights management (DRM) information, a Number of Publisher Keys requested and key type as well as any other information suitable for use in creating the PKR.

At step 520, the created (or existing) PKR is propagated toward a Publisher Key Vendor (PKV).

At step 530, the PKV determines if the PKR is valid and whether it is appropriate to adapt or constrain the request. Referring to box 535, interaction with the content owner may be needed to determine the validity of the request and any appropriate adaptations/constraints to be applied to the request. Alternatively, default limitations and/or constraints may be applied. Other actions may also be taken in response to the request.

At step 540, if the determination at step 530 indicates that the request is not valid, then the method 500 proceeds to step 550 where an error/denial message is transmitted toward the requesting content publishing entity.

At step 560, if the determination at step 530 indicates that the request is valid, then the method 500 proceeds to step 560 where one or more encrypted Publisher Key(s) PK are generated either as requested or according to any adaptations or constraints. A Publisher Unique Identification is also associated with the generated PK(s). Referring to box 565, interaction with the content owner or other entities is provided as needed to retrieve data for inclusion within the generated PK file or files. Additionally, interaction with the content owner or other entities such as bank or credit card processing entities is provided as needed to confirm satisfaction of financial terms associated with the PK.

At step 570, the generated PK file or files are transmitted toward the requesting content distribution entity.

At step 580, the requesting content distribution entity determines the distribution list associated with the generated PK file or files and accordingly distributes the generated PK file or files. Referring to box 585, the distribution list may be defined in terms of one or more colleagues, customers and partners, authorized publishers, members of authorized groups and/or using other determinative terms.

At step 590, members of the distribution list having received the generated PK file or files register the received publication key(s) PK with their respective presentation module PM to enable thereby secure presentation of the content.

Figure 6:
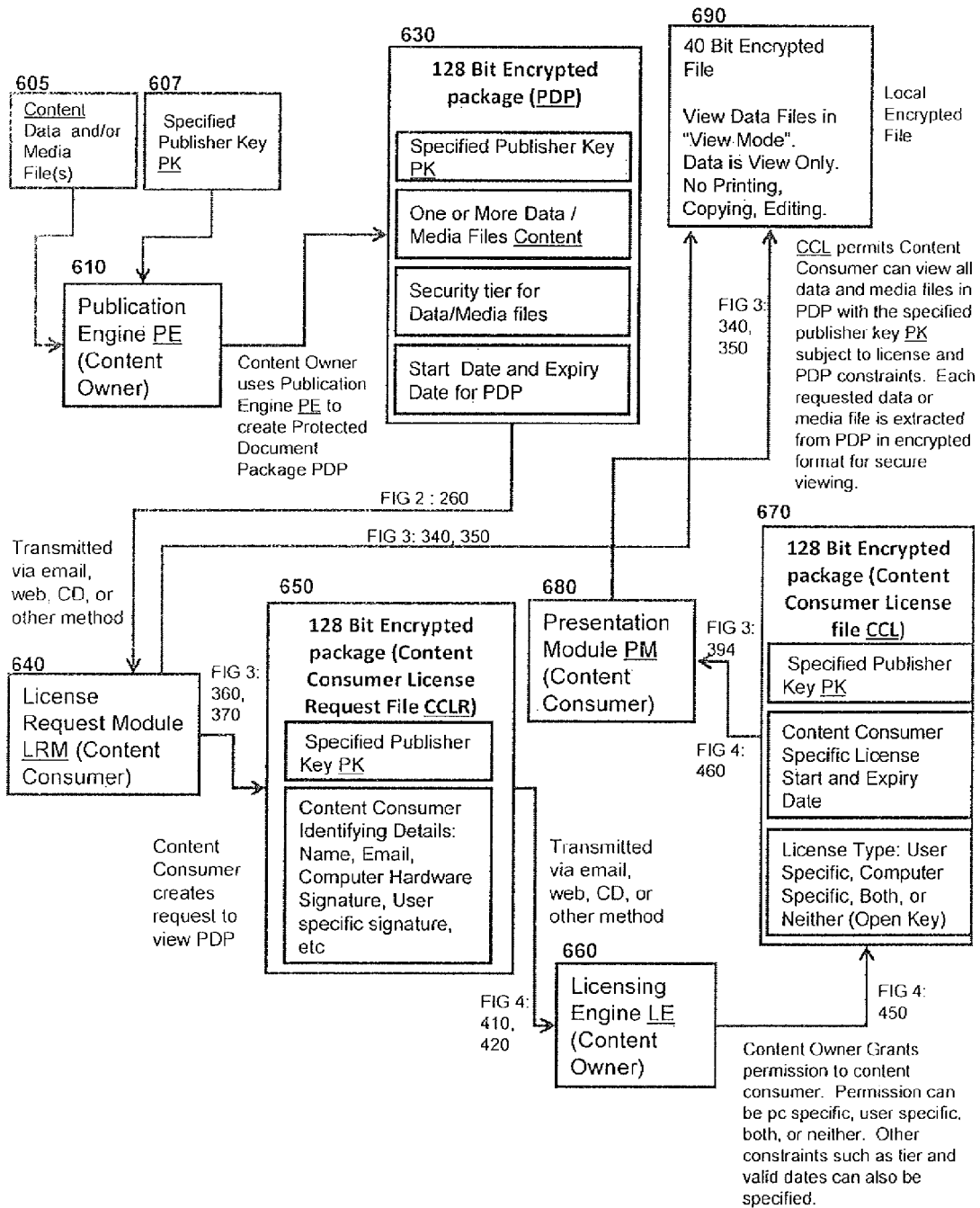
FIG. 6 graphically depicts an embodiment of the invention.

FIG. 6 graphically depicts an embodiment of the invention. Specifically, FIG. 6 depicts various interactions by elements within the various embodiments described herein with respect to FIGS. 1-5. Generally speaking, the various embodiments described herein contemplate a systems, apparatus, software, firmware and so on adapted to enable a content owner to create a protected document package for distribution to one or more end users for protected presentation. It is noted that the reference designators used in FIG. 6 coincide with reference designators used in the various other figures.

The content owner specifies the data and/or media files (box 605) and a publisher key PK (box 607) and uses a Publication Engine or Publisher (box 610) to create a Protected Document Package (PDP) that includes the data and/or media files, the specific Publisher Key PK, start and expiry dates for the protected document package and other licensing criteria/constraints (box 630) as previously discussed with respect to the various figures.

The PDP comprises, illustratively, a 128 bit encrypted data package or file. The PDP may be formed as a plurality of files bundled together such as a database file, a group of files and the like.

The content owner may use multiple publisher keys and may create multiple Protected Document Packages with each key. Thus the content owner can decide who, what, and when content consumers can view the contents of the files created by the content owner. Further, the content owner need not know the identity of the users authorized to view the Protected Document Packages at the time of creation of the protected document packages.

The end user receives the protected document package PDP from a content owner or other source via e-mail, FTP, optical media, magnetic media or other means and the LRM on user device 105 or server 107 of content consumer determines if the user has an existing and valid license for opening the Protected Document Package PDP. Existing licenses contain information about the Publisher Key PK specified for each license, the valid dates of the license, and information about license type. License types can be user specific, computer specific, both user and computer specific, or neither.

If the specified publisher key of the protected document package does not match the Publisher Key of any of the Publisher License Files on the user's computer, or if the date or license type is not valid, then the end user will be instructed to create a license request and send it to the content owner. As previously noted, the CCL may be delivered via email, web, optical media, magnetic media, semiconductor media or any other electronic transmission, software or hardware delivery method. For example, the CCL may be delivered via a hardware means such as a USB memory device, an SD memory device or other semiconductor memory device; a CD ROM, DVD or other optical memory device; or a hard disk drive, mass storage device or other media including thereon software instructions representing the CCL.

A hardware device provided the CCL may be constrained to a particular type of device (i.e., an approved device), such as a specific type or capacity of memory device. In various embodiments, the hardware device is merely used to deliver the CCL. In other embodiments, the hardware device including the CCL is necessary for presentation by the LCV. That is, the CCL operates as a hardware key to provide secure access or presentation of content.

For example, in one embodiment an entity such as an employer (content source) provides its employees (content consumers) with a specific type of hardware key that must be used to present the content. The employee must have the hardware key inserted in the computer to present the content.

For example, the CCL may be delivered via a hardware means such as a USB memory device, an SD memory device or other semiconductor, optical and/or magnetic memory device. (box 640).

The content owner has the option to grant permission to the end user. In particular, a License Request Module (LRM) operates to send a Content Consumer License Request (CCLR) to the content owner (box 650). The content owner, at its option, can grant (box 660) the end user a license for the specified license key. In the license, the content owner can also specify a license type which designates if the license is user specific, computer specific, both user and computer specific, or neither and can also specify valid start and expiry date of license (box 670).

Publisher Keys are used to restrict access to Protected Document Packages. Publisher Key Requests include, illustratively, identity of the requestor, the content owner, and allow the content owner to specify the publisher key type (single tier or multiple tier) and the number of keys requested. A multiple tier key type allows publishers to specify multiple security tiers for files in a Protected Document Package while a single tier key allows for only security group within a Protected Document Package. A key distribution program operated by the Publisher Key Vendor PKV accepts the Publisher Key Requests PKR and generates Publisher Key PK files for each key requested. The process for Publisher Key Requests PKR and Publisher Key PK distribution is illustrated in FIG. 5.

If the specified Publisher Key PK for an existing Content Consumer License matches the specified Publisher Key PK of the Protected Document Package PDP, and the date and license type are valid, then the user is able to access data files from the Protected Document Package PDP.

When the end user selects a data file from the Protected Document Package PDP, it is extracted into an encrypted temporary package (box 690) and displayed to the user using the corresponding Limited Capability Viewer LCV through, illustratively, methods for transferring data between applications such as object linking and embedding, dynamic data exchange, or related technology. The end user is prevented from printing, saving, or copying information from the data file. When the data file is closed, the temporary encrypted package is removed from the user's computer.

The various embodiments allow the buyer of a Publisher Key PK to create a content owner group by sharing the publisher key with one or more individuals. All such individuals can create Protected Document Packages PDP to share within the group and they can also grant end-user licenses to Protected Document Packages created by any individual using the shared key.

Figure 7:
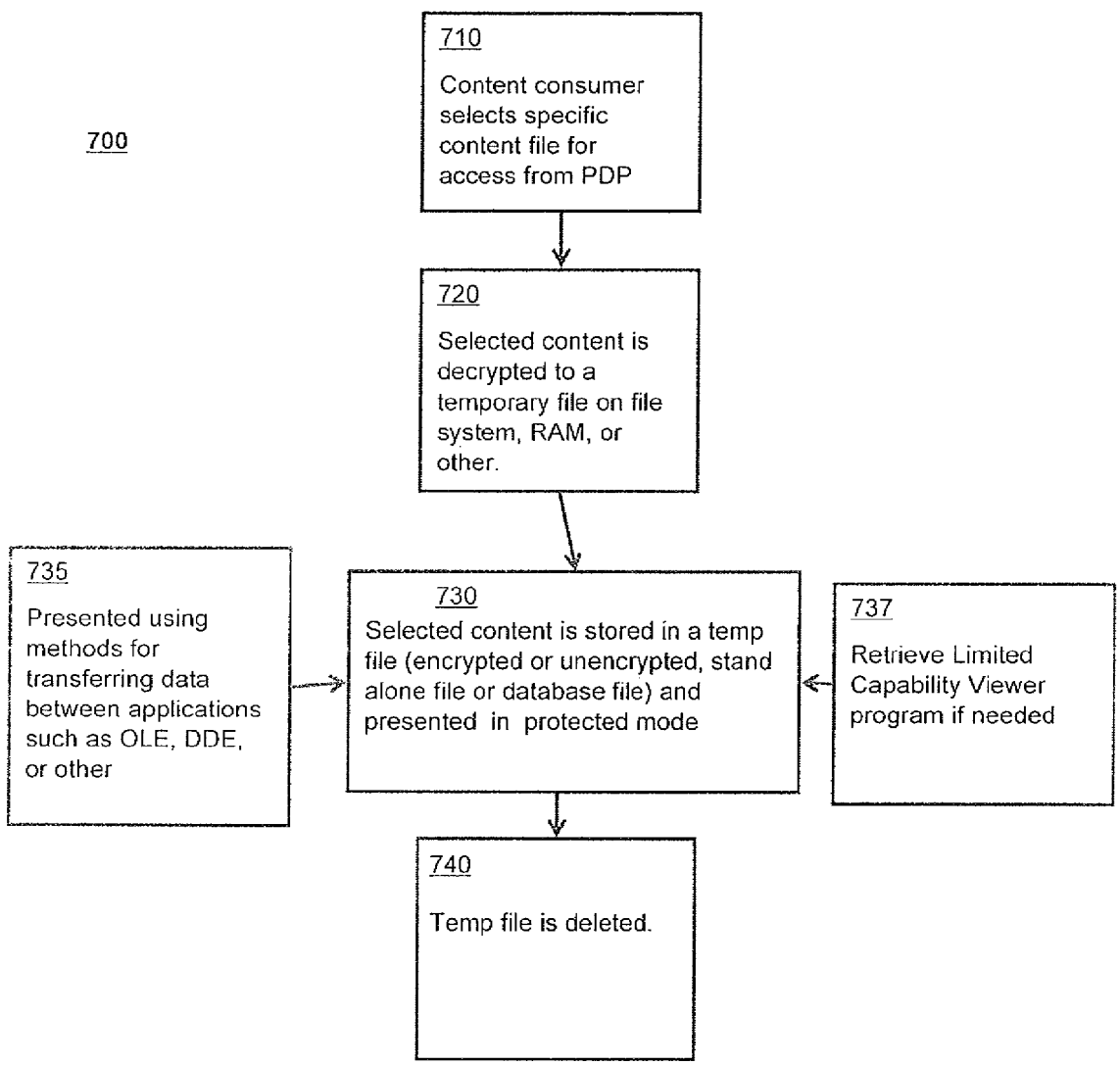
FIG. 7 depicts a flow diagram of a method for opening a Protected Document Package (PDP) and presenting content via a temporary file.

FIG. 7 depicts a flow diagram of a method for opening a PDP and presenting content via a temporary file. This method advantageously provides improved memory management capabilities as compared with methods for directly presenting a PDP, such as discussed below with respect to FIG. 8.

At step 710, the content consumer selects a specific content file for access from the PDP. For example, the PDP may comprise any suitable database file format, such as a format supported by Microsoft's Access database program, FileMaker's FileMaker Pro database program, any of the open source database programs, for use by Access (or other Microsoft program), FileMaker Pro (or other FileMaker, Inc. program), Oracle database (or other Oracle database program), or any of the open source database programs or formats. Generally speaking, individual content files and/or content file components may be stored or referred-to via fields within the PDP database file.

At step 720, the selected content is extracted or decrypted from the PDP file as a temporary file on the file system of the user device, a memory portion such as random access memory (RAM) on or associated with user device, or other data storage means.

At step 730, the selected content is stored in a temporary encrypted standalone file or database file or unencrypted standalone file or database file that is suitable for presentation in a protected mode of operation by a Limited Capability Viewer LCV program.

Referring to box 737, the limited capability viewer program is retrieved as needed. In various embodiments, the Limited Capability Viewer program is of a type typically available at user devices, such as a PowerPoint viewer within the Microsoft Office suite of programs. In various embodiments, the limited capability viewer program or a corresponding URL is included within the PDP.

Referring to box 735, the limited capability viewer program may present the content using methods for embedding and transferring data between applications such as Object Linking and Embedding (OLE), Dynamic Data Exchange (DDE) or other techniques enabling the extraction of content-representative objects from an encrypted or unencrypted file such that presentation of such objects by the Limited Capability Viewer LCV is performed in a secure manner.

At step 740, the temporary encrypted standalone file or database file, or unencrypted standalone file or database file, is deleted.

Figure 8:
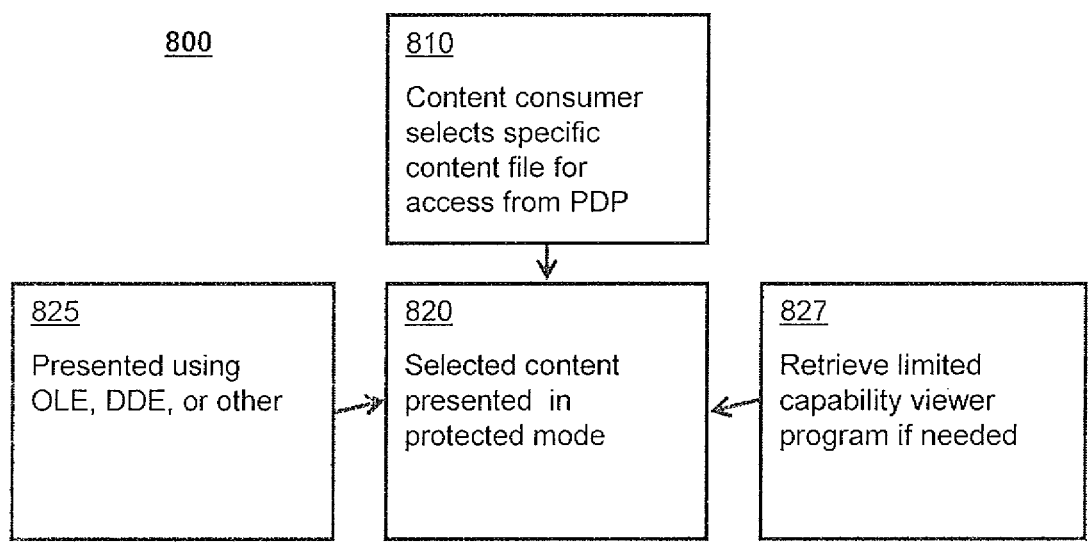
FIG. 8 depicts a flow diagram of a method for opening a Protected Document Package PDP and presenting content directly.

FIG. 8 depicts a flow diagram of a method for opening a PDP and presenting content directly from the PDP. This method advantageously provides improved security and performance capabilities as compared with methods for opening a PDP and presenting via temporary files, such as discussed above with respect to FIG. 7.

At step 810, the content consumer selects a specific content file for access from the PDP. For example, the PDP may comprise a database file format for use by the Microsoft Access database program or some other database program such as FileMaker, wherein individual content files are stored or referred-to via fields within the PDP database file.

At step 820, the selected content is extracted or decrypted from the PDP file and directly presented in a protected mode by the limited capability viewer program.

Referring to box 827, the Limited Capability Viewer LCV program is retrieved as needed. In various embodiments, the Limited Capability Viewer LCV program is of a type typically available at user devices, such as a PowerPoint viewer within the Microsoft Office suite of programs. In various embodiments, the limited capability viewer program or a corresponding URL is included within the PDP.

Referring to box 825, the Limited Capability Viewer LCV program may present the content using methods for embedding and transferring data between applications such as Object Linking and Embedding (OLE), Dynamic Data Exchange (DDE) or other techniques enabling the Limited Capability Viewer LCV program to securely present the content.

It will be appreciated by those skilled in the art that while various terms have been used to describe content providing entities such as content owner, content source, content publisher, content distributor, content rights holder and the like, these entities may comprise a single entity. In various embodiments, such as where a content owner is a different entity than a content distributor, the content owner may require that content be distributed according to specific file formats, encryption levels, quality levels and the like. In these embodiments, the content distributor will accept the appropriately formatted content from the content owner (or format the content as appropriate), and propagated content according to the required file format, encryption level, quality level and the like.

Generally speaking, the various rights associated with a particular content element may be defined by any of a content owner, content source, content distributor and/or content rights holder depending upon the contractual arrangements between these entities.

Although various embodiments which incorporate the teachings of the present invention have been shown and described in detail herein, those skilled in the art can readily devise many other varied embodiments that still incorporate these teachings.

What is claimed is:

1. A method for securely distributing content, comprising:
generating, at a server, a protected document package (PDP), said PDP including encrypted content, and a Publisher Key (PK) associated with said encrypted content;
said PK enabling decryption of said encrypted content for presentation via a Limited Capability Viewer (LCV) of an authorized user device,
said authorized user device comprising a user device having a Content Consumer License (CCL) compatible with the PK to enable thereby presentation via said LCV of locally stored encrypted content from said PDP,
said PDP including software instructions which, when executed by a processor at a proposed authorized user device, cause said proposed authorized user device to generate a Content Consumer License Request (CCLR) identifying said PK;
propagating the PDP toward at least one authorized or proposed authorized user device;
receiving from a proposed authorized user device having said PDP a CCLR identifying said PK; and
propagating a CCL compatible with the PK toward said proposed authorized user device if said CCLR is valid.

2. The method of claim 1, wherein said authorized user device is identified according to one or more of e-mail address, a domain name user identifier, and a computer identifier.

3. The method of claim 1, wherein authorized use is defined by the PK as one or more of an authorized presentation start time, an authorized presentation start date, an authorized presentation expiration time, and an authorized presentation expiration date.

4. The method of claim 1, wherein authorized use is defined by the PK as one or more of a password protection layer, an encryption type, a presentation program type, authorized user device geographical location, and an authorized user device IP address range.

5. The method of claim 1, wherein said PDP comprises a self-executing PDP.

6. The method of claim 1, wherein the PDP is further configured to provide the LCV.

7. The method of claim 1, wherein determining whether the CCLR is valid comprises interacting with an owner associated with requested content to determine if the requesting proposed authorized user device should be granted access to said content.

8. The method of claim 7, wherein generating a CCL comprises interacting with an owner associated with the requested content to receive therefrom appropriate licensing constraints associated with granting authorization for content presentation by a requesting proposed authorized user device.

9. The method of claim 1, wherein the PDP comprises a database file including said content.

10. The method of claim 1, wherein the LCV is adapted for presenting content portion representative objects extracted from the PDP.

11. The method of claim 1, wherein the LCV uses Object Linking and Embedding (OLE) or Dynamic Data Exchange to retrieve content portion representative objects for presentation.

12. The method of claim 1, wherein the content within the PDP is adapted to be opened directly from the PDP by the LCV.

13. The method of claim 1, wherein the content within the PDP is adapted to be extracted from the PDP and stored as a temporary file that is adapted to be opened by the LCV.

14. The method of claim 13, wherein the temporary file comprises the encrypted content from the PDP.

15. The method of claim 1, wherein the CCL compatible with the encrypted PK is managed via a central user management directory.

16. The method of claim 1, wherein the CCL compatible with the encrypted PK is managed via a content distribution entity.

17. The method of claim 1, wherein the CCL compatible with the encrypted PK is managed via a content owner.

18. The method of claim 1, wherein the Publisher Key (PK) defines a plurality of licensing tiers, each licensing tier defined by licensing parameters associated with presentation of said content by an authorized user device via a LCV.

19. The method of claim 18, wherein each of said PK licensing tiers is compatible with a respective Content Consumer License (CCL).

20. The method of claim 19, wherein said plurality of PK licensing tiers are arranged in a hierarchical fashion, and a CCL compatible with a licensing tier of a first level is also compatible with all licensing tiers hierarchically lower than said first level.

21. The method of claim 19, wherein access segmentation among recipients of said protected document package is enabled by selective distribution of content consumer licenses (CCLs) compatible with said PK licensing tiers.

22. The method of claim 13, wherein the temporary file that is adapted to be opened by the Limited Capability Viewer (LCV) is defined by a content publisher.

23. The method of claim 22, wherein the publisher defined temporary file is stored within the PDP in the manner defined by the publisher.

24. The method of claim 1, further comprising defining a secure document sharing group including user members authorized to view and/or modify the content within the PDP.

25. An apparatus for securely distributing content, comprising:
a processor configured for:
generating a protected document package (PDP) said PDP including encrypted content, and a Publisher Key (PK) associated with said encrypted content;
said PK enabling decryption of said encrypted content for presentation via a Limited Capability Viewer (LCV) of an authorized user device,
said authorized user device comprising a user device having a Content Consumer License (CCL) compatible with the PK to enable thereby presentation via said LCV of locally stored encrypted content from said PDP,
said PDP including software instructions which, when executed by a processor at a proposed authorized user device, cause said proposed authorized user device to generate a Content Consumer License Request (CCLR) identifying said PK;
propagating the PDP toward at least one authorized or proposed authorized user device;
receiving from a proposed authorized user device having said PDP a CCLR identifying said PK; and
propagating a CCL compatible with the PK toward said proposed authorized user device if said CCLR is valid.

26. The apparatus of claim 25, wherein the processor is further configured for:
generating a Content Consumer License (CCL) for each authorized user device; and
distributing the CCL toward each authorized user device.

27. The apparatus of claim 26, wherein the CCL is distributed via a non-transitory computer readable storage medium.

28. The apparatus of claim 27, wherein the CCL is only effective when the non-transitory computer readable storage medium including the CCL is operatively connected to a computing device associated with an authorized user device.

29. A non-transitory computer readable medium including software instructions which, when executed by a processor, perform a method for securely distributing content, comprising:
generating, at a server, a protected document package (PDP) said PDP including encrypted content, and a Publisher Key (PK) associated with said encrypted content;
said PK enabling decryption of said encrypted content for presentation via a Limited Capability Viewer (LCV) of an authorized user device,
said authorized user device comprising a user device having a Content Consumer License (CCL) compatible with the PK to enable thereby presentation via said LCV of locally stored encrypted content from said PDP,
said PDP including software instructions which, when executed by a processor at a proposed authorized user device, cause said proposed authorized user device to generate a Content Consumer License Request (CCLR) identifying said PK;
propagating the PDP toward at least one authorized or proposed authorized user device;
receiving from a proposed authorized user device having said PDP a CCLR identifying said PK; and
propagating a CCL compatible with the PK toward said proposed authorized user device if said CCLR is valid.

30. A computer program product, wherein a computer is operative to process software instructions which adapt the operation of the computer such that computer performs a method for securely distributing content, comprising:
generating, at a server, a protected document package (PDP) said PDP including encrypted content, and a Publisher Key (PK) associated with said encrypted content;
said PK enabling decryption of said encrypted content for presentation via a Limited Capability Viewer (LCV) of an authorized user device,
said authorized user device comprising a user device having a Content Consumer License (CCL) compatible with the PK to enable thereby presentation via said LCV of locally stored encrypted content from said PDP,
said PDP including software instructions which, when executed by a processor at a proposed authorized user device, cause said proposed authorized user device to generate a Content Consumer License Request (CCLR) identifying said PK;

propagating the PDP toward at least one authorized or proposed authorized user device;

receiving from a proposed authorized user device having said PDP a CCLR identifying said PK; and propagating a CCL compatible with the PK toward said proposed authorized user device if said CCLR is valid.

31. A method for securely receiving content at a user device including a tangible and non-transitory memory and a processor, said processor configured for:

receiving, at said user device, a protected document package (PDP) including encrypted content, and a Publisher Key (PK) associated with said encrypted content;

said PK enabling decryption of said encrypted content for presentation via a Limited Capability Viewer (LCV) of an authorized user device, said authorized user device comprising a user device having a Content Consumer License (CCL) compatible with the PK to enable thereby presentation via said LCV of locally stored encrypted content from said PDP, said PDP including software instructions which, when executed by a processor at the user device, generate a Content Consumer License Request (CCLR) identifying said PK;

in the case of said user device having a CCL compatible with the PK, performing the steps of storing, in user device memory, encrypted content included within said PDP and presenting, via a user device LCV, the stored encrypted content;

in the case of said user device not having a CCL compatible with the PK, performing the steps of generating a Content Consumer License Request (CCLR) identifying said PK and transmitting said CCLR toward a source of said PDP.

32. The method of claim 31, further comprising transmitting a Content Consumer License Request (CCLR) in response to a determination that a CCL compatible with the PK included within the PDP is not available at the user device.

* * * * *

(12) EX PARTE REEXAMINATION CERTIFICATE (12002nd)

United States Patent
Phadke et al.

(10) Number: US 9,615,116 C1
(45) Certificate Issued: Feb. 14, 2022

(54) SYSTEM, METHOD AND APPARATUS FOR SECURELY DISTRIBUTING CONTENT

(75) Inventors: Madhav S. Phadke, Colts Neck, NJ (US); Kedar M. Phadke, Colts Neck, NJ (US)

(73) Assignee: paSafeShare LLC

Reexamination Request:
No. 90/014,739, Apr. 27, 2021

Reexamination Certificate for:
Patent No.: 9,615,116
Issued: Apr. 4, 2017
Appl. No.: 13/162,209
Filed: Jun. 16, 2011

(51) Int. Cl.
*H04K 1/00* (2006.01)
*H04N 21/254* (2011.01)
*H04L 29/06* (2006.01)
*H04N 21/4627* (2011.01)

(52) U.S. Cl.
CPC ..... *H04N 21/4627* (2013.01); *H04L 63/0428* (2013.01); *H04N 21/2541* (2013.01); *H04L 2463/041* (2013.01)

(58) Field of Classification Search
None
See application file for complete search history.

(56) References Cited

To view the complete listing of prior art documents cited during the proceeding for Reexamination Control Number 90/014,739, please refer to the USPTO's public Patent Application Information Retrieval (PAIR) system under the Display References tab.

*Primary Examiner* — Matthew E Heneghan

(57) ABSTRACT

System, method and apparatus for securely distributing content via an encrypted file wherein a Publisher Key (PK) associated with an authorized publisher enables presentation of the content by the authorized user via a Limited Capability Viewer (LCV), the LCV lacking the capability to forward, print, copy or otherwise disseminate the content to be presented.

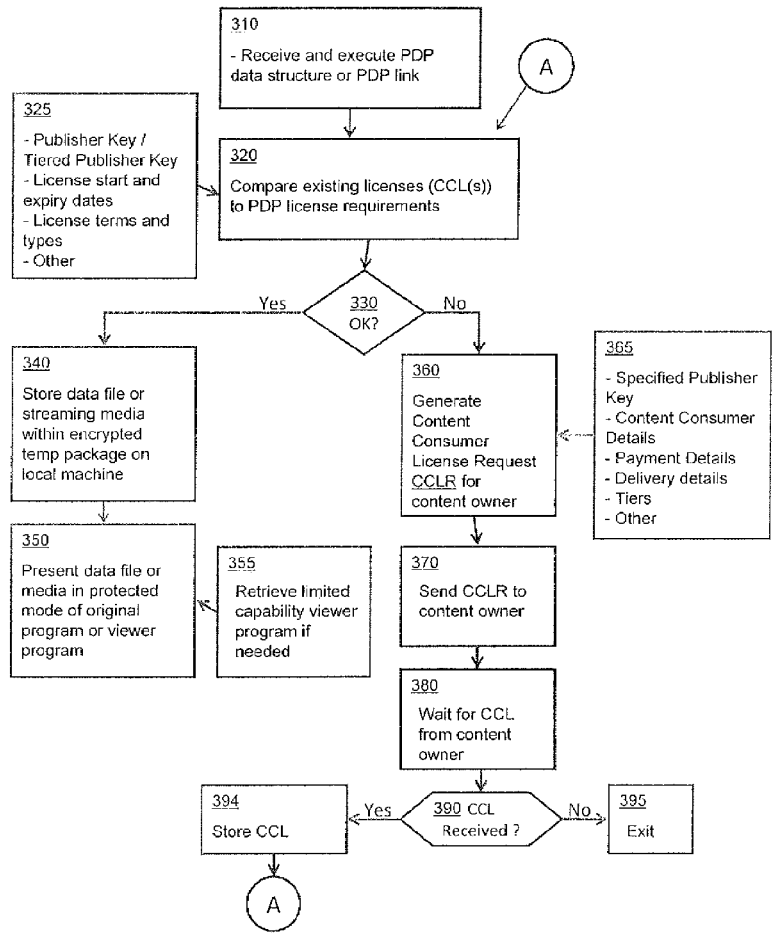

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-4, 6, 12, 15, 17, 24-27 and 29-31 is confirmed.

Claims 5, 7-11, 13, 14, 16, 18-23, 28 and 32 were not reexamined.

\* \* \* \* \*